Dec. 1, 1934. H. C. PEFFER 1,983,674
WELDING TORCH
Filed Feb. 18, 1931 2 Sheets-Sheet 2
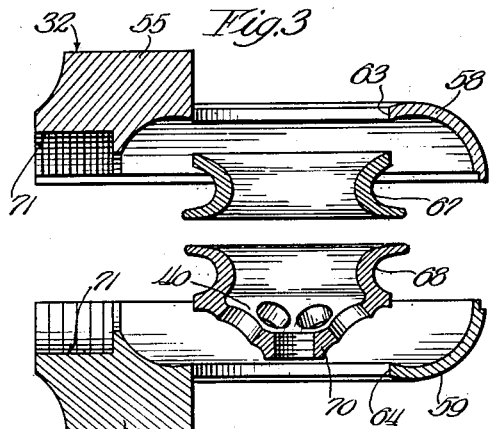
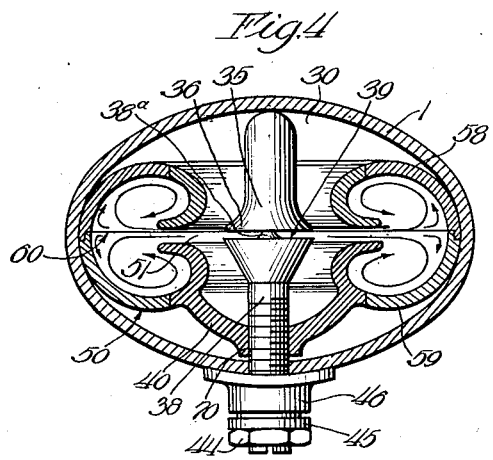
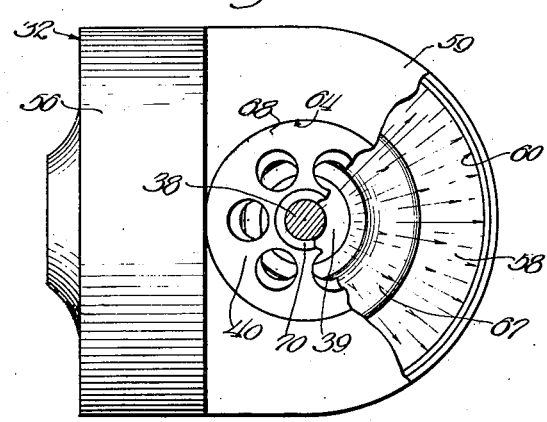
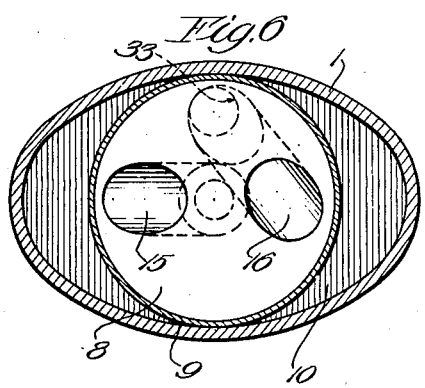
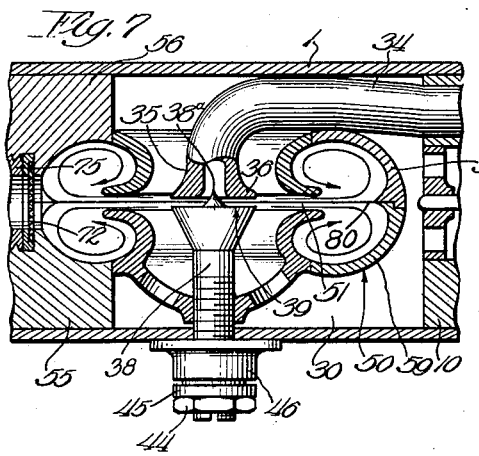
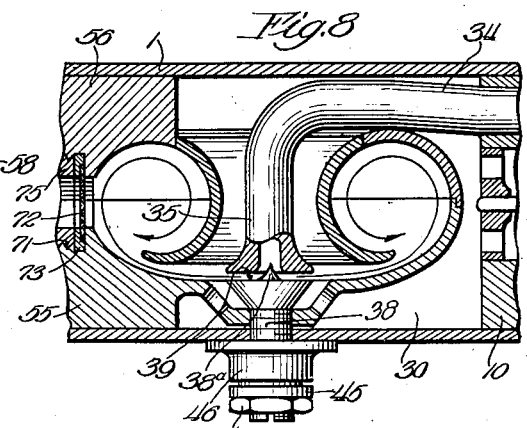
Inventor:
Harry C. Peffer
By Braun Jackson Botticher & Denner
Attys.

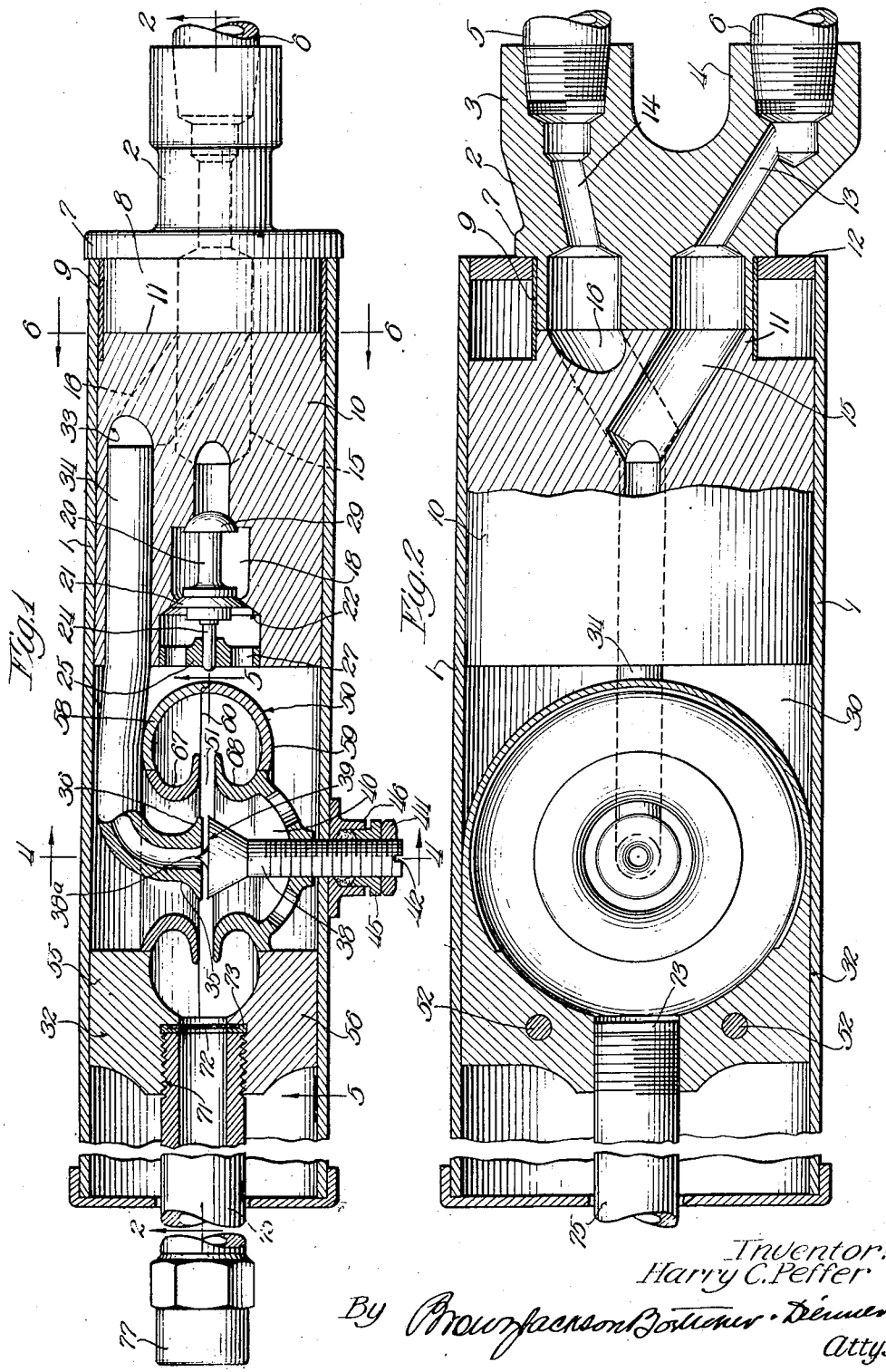

Patented Dec. 11, 1934

1,983,674

UNITED STATES PATENT OFFICE 1,983,674

WELDING TORCH

Harry C. Peffer, La Fayette, Ind., assignor, by mesne assignments, to Utilities Research Commission, Inc., Chicago, Ill., a corporation of Illinois Application February 18, 1931, Serial No. 516,533

2 Claims. (Cl. 158—27.4)

The present invention relates generally to the art of autogenous welding, brazing and cutting metals by the application of a high temperature flame usually obtained by the combustion of a mixture of gases, usually a combustible gas and oxygen under high or low pressure.

More particularly, the present invention has to do with the provision of apparatus and methods for utilizing ordinary illuminating gas as the combustible gas. Prior to my invention attempts along this line were not greatly successful. Many of the metals met with in commercial practice have a relative high melting or fusing point and, in addition, conduct heat away from the welding zone with considerable rapidity. Among such metals wrought iron and structural steels may be mentioned, and in order to be practical it is essential that any improvement in the art of welding and the like must be applicable to these metals in the thickness and under the conditions as actually found in the industries. Some welding with illuminating gas has been accomplished but only on relatively thin sheets where heat losses due to high conductivity were not serious, but when attempts were made to use illuminating gas on metals of greater thickness, the welds secured were not satisfactory, whereas with the present invention welds with wrought iron of considerable thickness have been successfully obtained.

The present invention, therefore, has for its principal object the provision of improved means and methods for utilizing a combustible gas or gases of relatively low calorific value, such as, for example, ordinary commercial illuminating gas in the art of welding, brazing, or the like. These improvements, presently to be described in detail, are principally directed to the feature of securing a perfect and intimate mixture of the gases so that the combustion thereof will proceed at a sufficiently rapid rate and be sufficiently efficient that gases of low heat value can be satisfactorily employed.

The present invention is, however, equally adapted to use any gas or gases, and cutting operations are greatly facilitated, since the thorough and intimate mixing of the gases results in their uniform combustion so that they are used with great economy and efficiency.

Briefly, the present invention employs the principle of spreading out one of the incoming gases in a thin layer or film and passing it through a restricted opening in the presence of the other gas to cause the former to entrain and carry with it by aspiration definite controlled amounts of the latter gas, together with the feature of subsequently expanding, changing the direction and velocity of flow, and otherwise agitating the gases to effect a thorough and intimate mixture thereof.

While I have briefly outlined above some of the generic features of the present invention, other objects and advantages of my invention will be apparent to those skilled in the art after a consideration of the following description of one preferred structural embodiment thereof, taken in conjunction with the accompanying drawings in which:

Figure 1 is a longitudinal cross section through my improved welding torch;

Figure 2 is a longitudinal cross section taken on the line 2—2 of Figure 1;

Figure 3 is a disassembled view of the mixing ring or expansion chamber;

Figure 4 is a transverse cross section taken substantially along the line 4—4 of Figure 1;

Figure 5 is a bottom view of the mixing ring or expansion chamber, corresponding to a view taken along the line 5—5 of Figure 1;

Figure 6 is a cross section taken along the line 6—6 of Figure 1; and

Figures 7 and 8 show modified forms of my welding torch.

Referring now more particularly to Figures 1 and 2, the reference numeral 1 indicates the casing or housing of my improved welding torch. The casing or housing 1 may be used as a handle for the torch if desired. At one end of the housing or casing 1 there is provided a gas receiving head or handle butt 2 having a pair of gas connections 3 and 4 suitably bored and threaded to provide for connection with gas connections 5 and 6 and suitable valves (not shown) leading to separate sources of gas supply, a combustible gas and oxygen in the present case. The head 2 includes a flange 7 and a cylindrical portion 8 which has a press fit with a cylindrical collar 9. The collar is securely fixed to a valve block 10 by means of a correspondingly formed cylindrical portion 11 thereon. A plate 12 closes the end of the housing 1.

The bores 13 and 14 formed in the head 2 communicate respectively with a pair of bores 15 and 16 formed in the valve block 10 as best shown in Figures 1 and 6. A valve chamber 18 is formed within the block 10 and in communication with the bore 15. The valve chamber 18 is provided with a suitably formed check valve 20 having a leather gasket or flange 21 adapted to seat against a valve seat 22 in the valve chamber 18. The valve 20 also includes a stem 24 mounted for movement within a suitable bore in a spider or valve retainer 25 having a press fit within the valve chamber 18. The spider or retainer 25 is formed with a plurality of openings 27 to permit the flow of gas therethrough. The valve 20 also carries a spherical head 29 seating within a portion of the valve chamber 18 and acting to center the check valve 20 in its closed position and to cut off communication between the chamber 18 and the bore 15.

The valve chamber 18, controlled by the check valve 20, opens into and is in communication with the space between the block 10 and a forward head 32 securely fixed within the housing or casing 1, which space forms a mixing chamber 30. The bore 16 in the valve block 10 is provided with a continuation 33 within which is secured a tube 34 having an end 35 deflected laterally and extending to a point substantially centrally of the space or mixing chamber 30, as best shown in Figure 1. The end 35 of the tube 34 is formed in a shape of a nozzle carrying an outwardly extending radial flange 36. Preferably, the plane of the nozzle or outlet end 35 of the tube 34 lies in a plane substantially coinciding with a longitudinal plane of the housing or handle 1.

For the purpose of spreading the gas or gases emerging from the nozzle 35 a deflection stud 38, having a pointed projection 38ᵃ entering the flared end of the nozzle and curved to cooperate therewith and a flat face 39, is mounted within the space or mixing chamber 30. Preferably the flat face 39 is in a plane parallel with but closely spaced with respect to the plane of the nozzle 35. The deflection stud 38 is adjustably mounted in the handle 1 by means of its threaded connection with the central portion of a spider or ring 40 connected with the head 32 as will be more fully explained later. The outer end of the stem is provided with a small kerf 42 by means of which the stud may be adjusted to a position closer or farther away from the nozzle 35. The stud is retained in adjusted position by means of a lock nut 44 and an associated bushing 45 received in a collar 46 fixed to the handle housing 1.

The purpose of a deflection stud 38 is to spread the gas stream emerging from the nozzle 35 in all directions in the form of a thin discoidal jet affording a considerable area of contact.

An expansion chamber or mixing ring is provided within the mixing chamber 30 and is designated in its entirety by the reference numeral 50. This expansion chamber is in the form of a hollow annulus or toroidal member having a slot 51 around the inner circumference thereof and positioned to receive the jet coming from the deflection stud 38. The walls of the mixing ring or expansion chamber 50 preferably turn inwardly adjacent the slot 51 and away from the nozzle 35. This offers a gradually decreasing annular orifice for the discoidal jet. The interior wall of the expansion chamber 50 follows the outer surface of the toroidal mixing ring so that opportunity is provided for the expansion of the discoidal jet of gas emerging from between the nozzle 35 and the deflection stud 38.

Preferably, the mixing ring or extension chamber is formed in sections as best shown in Figures 1, 3 and 4. The head 32 which is oblong in cross section, corresponding to the cross section of the valve block 10, is preferably formed in two parts separable on the long axis of the oblong, these parts being indicated by the reference numerals 55 and 56 and are secured together by means of dowels 52. These sections have segments 58 and 59 respectively formed integrally therewith, the segments having a lap joint indicated by the reference numeral 60 in Figures 1 and 4.

The segments 58 and 59 each have a central aperture 63 and 64 in which the rings 67 and 68 are respectively fitted. The ring 68 carries the ring or spider 40 having a central portion 70 which is threaded and adapted to receive the threaded end of the deflection stud 38, as best shown in Figures 1 and 4. The rings 67 and 68 cooperate with the segments 63 and 64 to form the mixing ring or extension chamber 50 which receives the flat jet from the nozzle 35, as described above.

An outlet from the interior of the mixing ring or expansion chamber 50 is provided in the head 32. The two sections 55 and 56 forming the head 32 are bored to provide a port 71 leading from the interior of the mixing ring 50. Preferably, the bore 71 is threaded at one end and is reduced at the other end to provide a shoulder against which is received a screen 72 formed preferably of copper gauze and held in place by a lead retainer ring 73. The threaded end of the bore 71 receives the outlet conduit or tubing 75, the outer end of which carries a welding nozzle 77 of any desired type.

The operation of my improved welding torch is substantially as follows. Oxygen under pressure enters the torch handle 1 through the bores 14 and 16 and through the oxygen tube 34. Passing out through the nozzle end 35 of the oxygen stream impinges on the stud 38 which spreads or expands the oxygen stream in all directions in a thin discoidal jet. At the same time the combustible gas enters through the bores 13 and 15, past the check valve 20, and into the mixing chamber or space 30 surrounding the mixing ring 50 and the nozzle 35. Thus the expanded oxygen jet presents a substantial area of contact to the combustible gas in the mixing chamber 30. The thin jet of oxygen moves at a relatively high velocity and in passing through the narrow slot 51 and into the mixing ring 50 pulls with it a proportioned amount of combustible gas by aspiration. Thus a certain amount of combustible is entrained in the flow of oxygen, this action being greatly facilitated by the comparatively great area of oxygen in contact with the combustible.

The rapidly moving jet of oxygen and combustible enters the interior of the gas ring 50 and impinges upon the interior surface of the outer wall thereof. This impact scatters the gas particles, causing them to flow in opposite directions in a radial plane and away from the point of impact. Thus the jet of oxygen and combustible is divided and caused to flow around the walls of the mixing ring back toward the axis of the mixing ring as indicated in Figure 4. As the two branches of the jet approach the walls formed by the rings 67 and 68 they are again reversed and caused to flow against the incoming jet of oxygen and combustible. By virtue of this construction and operation the incoming discoidal jet of oxygen and combustible entering the mixing ring 50 is almost immediately struck on both sides by the two branches flowing back along the walls of the mixing ring and toward the slot 51. This breaks up and scatters any slug of unmixed gas. Since the interior of the mixing expansion chamber 50 is of greater area than the cross section of the narrow slot 51, the gases entering through the slot expand and, aided by the velocity of the discoidal jet, form a swirling mass the direction of the particles thereof being changed and reversed a number of times, not only in a radial plane but also as the gases travel around the mixing ring 50 and toward the outlet tube or conduit 75. It is to be noted that this swirling mass approaches the outlet port 75 from two directions. The proportion of oxygen to combustible may be controlled by adjusting the position of the deflection stud 38 with respect to the nozzle 35.

In Figures 1 to 4, I have illustrated the mixing ring as having an interior wall lying substantially perpendicular to the discoidal jet which impacts squarely against and divides into two branches as described above and is indicated in Figure 4. In Figure 7, I have shown the mixing ring 50 and the segments 58 and 59 thereof as presenting a sharp edge or ridge 80 to the gas flow and which splits the jet and forms two branches with somewhat less turbulency than the form shown in Figure 4 but with substantially the same ultimate result, namely, converging the two branches backwardly and inwardly upon themselves to impinge upon the incoming gas streams. In Figures 4 and 7 I have indicated what I believe to be the path of movement of the gas streams, and also in Figure 8 which illustrates another modification now to be described.

While I have shown the jet of oxygen as entering the mixing ring or expansion chamber 50 substantially in the central plane thereof it is to be understood that I do not limit myself to this particular location. If desired, the slot 51 may be arranged so that the gases enter the mixing ring tangentially as illustrated in Figure 8 where I have illustrated how a cross section through the mixing ring would appear where the jet of incoming oxygen and combustible is arranged to enter tangentially. In this case an exceptionally vigorous admixture is obtained, probably because the gases are reversed or rotate in a radial plane a longer time or more rapidly before passing to the outlet 75 than is the case in Figures 2 and 4.

While I have shown and described the preferred structural embodiment of the present invention, it is to be understood that widely different means may be employed in the practice of the broader aspects of the present invention. For example, I have described the casing or housing 1 as being adapted to be formed as a handle for the welding torch. My improved mixing device may, however, be located other than within the handle of the torch. It may be used as an attachment to the torch, operating partly or wholly outside the handle thereof.

What I claim, and desire to secure by Letters Patent is:

1. A welding torch comprising, in combination, a pair of separated gas conduits, an elongated casing serving as a mixing chamber, means placing the mixing chamber in communication with one of the conduits, a delivery nozzle communicating with the other of said conduits and extending longitudinally of said chamber and having its outlet end bent at substantially right angles to the main portion of the nozzle, a deflecting stud extending transversely of said elongated casing intermediate its ends and fixed adjacent to and cooperating with said nozzle so as to spread the gas flow from said nozzle into a thin discoidal jet lying in a plane which includes the major axis of said elongated casing and serving to direct the gas flow into contact with the gas in said chamber, whereby the two gases are mixed, and means conducting the mixed gases from said chamber.

2. A welding torch comprising, in combination, a pair of separated gas conduits, an elongated casing serving as a handle for the torch and having a hollow portion serving as a mixing chamber, means placing the chamber in communication with one of said conduits, a delivery conduit communicating with the other of said conduits and extending longitudinally of said handle member and having its outlet end disposed to direct the gas flow therefrom at substantially right angles to the main portion of said delivery conduit and at substantially right angles to the major axis of said elongated casing, a stud extending transversely of said elongated casing and fixed adjacent to and cooperating with the outlet end of said delivery conduit to spread the gas flow therefrom into a thin discoidal jet lying in a plane which includes the major axis of said elongated casing and serving to direct the flow into contact with the gas in said chamber, means defining an annular auxiliary mixing chamber within the hollow portion of said casing and having its central plane coinciding with the plane of said discoidal jet, said auxiliary mixing chamber having a narrow opening to receive said jet, whereby the latter in passing therethrough entrains a proportioned amount of gas in the first mixing chamber, and outlet means extending from said auxiliary mixing chamber in the opposite direction from said delivery conduit.

HARRY C. PEFFER.